US009278740B1

(12) United States Patent
Andrasko et al.

(10) Patent No.: US 9,278,740 B1
(45) Date of Patent: Mar. 8, 2016

(54) SYSTEM AND METHOD FOR CONTROLLING ATTITUDE OF A MARINE VESSEL HAVING TRIM TABS

(71) Applicant: Brunswick Corporation, Lake Forest, IL (US)

(72) Inventors: Steven J. Andrasko, Oshkosh, WI (US); Aaron J. Ward, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 59 days.

(21) Appl. No.: 14/472,565

(22) Filed: Aug. 29, 2014

(51) Int. Cl.
B63B 39/06 (2006.01)
G05D 1/08 (2006.01)

(52) U.S. Cl.
CPC .......... B63B 39/061 (2013.01); G05D 1/0875 (2013.01)

(58) Field of Classification Search
CPC .................. B63B 39/061; G05D 1/0875
See application file for complete search history.

(56) References Cited

U.S. PATENT DOCUMENTS

| 4,401,888 | A | 8/1983 | West et al. |
| 4,749,926 | A | 6/1988 | Ontolchik |
| 5,263,432 | A | 11/1993 | Davis |
| 5,383,419 | A | 1/1995 | Stevens |
| 5,385,110 | A | 1/1995 | Bennett et al. |
| 5,474,012 | A | 12/1995 | Yamada et al. |
| 5,507,672 | A | 4/1996 | Imaeda |
| 5,540,174 | A | 7/1996 | Kishi et al. |
| 5,683,275 | A | 11/1997 | Nanami |
| 5,879,209 | A | 3/1999 | Jones |
| 6,007,391 | A | 12/1999 | Eilert |
| 6,354,237 | B1 | 3/2002 | Gaynor et al. |
| 6,583,728 | B1 | 6/2003 | Staerzl |
| 7,156,709 | B1 | 1/2007 | Staerzl et al. |
| 7,188,581 | B1 | 3/2007 | Davis et al. |
| 7,222,577 | B2 | 5/2007 | Morvillo |
| 7,565,876 | B2 | 7/2009 | Wilson et al. |
| 7,641,525 | B2 | 1/2010 | Morvillo |
| 8,145,370 | B2 | 3/2012 | Borrett |
| 8,480,445 | B2 | 7/2013 | Morvillo |
| 8,583,300 | B2 | 11/2013 | Oehlgrien et al. |

(Continued)

OTHER PUBLICATIONS

Nauticus Inc., Smart Tabs™ SX, http://www.nauticusinc.com/smart_tabsSX.htm, website visited Aug. 24, 2010, 2 pages.

(Continued)

Primary Examiner — John Q Nguyen
Assistant Examiner — Michael Kerrigan
(74) Attorney, Agent, or Firm — Andrus Intellectual Property Law, LLP

(57) ABSTRACT

A system for controlling an attitude of a marine vessel having first and second trim tabs includes a controller having vessel roll and pitch control sections. The pitch control section compares an actual vessel pitch angle to a predetermined desired vessel pitch angle and outputs a deployment setpoint that is calculated to achieve the desired pitch angle. The roll control section compares an actual vessel roll angle to a predetermined desired vessel roll angle, and outputs a desired differential between the first and second deployments that is calculated to maintain the vessel at the desired vessel roll angle. When the controller determines that the magnitude of a requested vessel turn is greater than a first predetermined threshold, the controller decreases the desired differential between the first and second deployments, and accounts for the decreased desired differential deployment in its calculation of the first and second deployments.

20 Claims, 6 Drawing Sheets

(56) References Cited

U.S. PATENT DOCUMENTS

| | | |
|---|---|---|
| 8,622,777 B1 | 1/2014 | McNalley et al. |
| 8,631,753 B2 | 1/2014 | Morvillo |
| 2014/0277851 A1 | 9/2014 | Grace et al. |

OTHER PUBLICATIONS

Insta Trim Boat Leveler Co., "It's Smooth Boating Ahead", Owner's Manual, http://insta-trim.com, website visited Aug. 24, 2010, 9 pages.

Nauticus Inc., Smart Tabs™ Understanding Boat Balance & Performance, brochure, available at least as early as 2001, pp. 2-8 and 11.

SYSTEM AND METHOD FOR CONTROLLING ATTITUDE OF A MARINE VESSEL HAVING TRIM TABS

FIELD

The present disclosure relates to systems and methods for controlling an attitude of a marine vessel. Specifically, the present disclosure relates to controlling the attitude of a marine vessel having at least first and second trim tabs attached to a rear of the marine vessel.

BACKGROUND

U.S. Pat. No. 6,354,237 discloses a trim tab control system in which four buttons or switches are provided for the marine operator in which the operator can select to raise the bow, raise the stern, raise the port side of the boat, or raise the stern side of the boat in relative terms, and the system will automatically position the trim tabs to most efficiently achieve the operator's demanded change in position of the marine vessel.

U.S. Pat. No. 6,583,728 discloses a trim tab monitoring circuit which receives a signal that is representative of a voltage potential across a stator winding of a motor which is attached to the trim tab. This signal is passed through a high pass filter to remove the DC component of the signal, amplified, and passed through a low pass filter to remove certain high frequencies components of the signal. A zero crossing detector is used to discern individual pulses which are then received by a counter that provides a single output pulse for a predetermined number of input pulses. The series of output pulses from the counter are conditioned and, in conjunction with a direction sensor, provided to an up/down counter controller that provides digital signals to a signal output circuit. The signal output circuit provides a DC voltage output to a display and the DC output voltage is representative of the position of the trim tab.

U.S. Pat. No. 7,188,581 discloses a marine drive and a marine vessel and drive combination having a trim tab with a forward end pivotally mounted to a marine propulsion device.

Each of the above patents is hereby incorporated herein by reference in its entirety.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a system for controlling an attitude of a marine vessel having first and second trim tabs comprises a controller having a vessel roll control section and a vessel pitch control section. First and second trim tab actuators are in signal communication with the controller that actuate the first and second trim tabs to first and second deployments, respectively. A roll sensor provides an actual vessel roll angle to the roll control section and a pitch sensor provides an actual vessel pitch angle to the pitch control section. The pitch control section compares the actual vessel pitch angle to a predetermined desired vessel pitch angle and outputs a deployment setpoint that is calculated to achieve the desired pitch angle. The roll control section compares the actual vessel roll angle to a predetermined desired vessel roll angle, and outputs a desired differential between the first and second deployments that is calculated to maintain the vessel at the desired vessel roll angle. The controller accounts for both the deployment setpoint output from the pitch control section and the desired differential output from the roll control section in its calculation of the first and second deployments to which the first and second trim tabs are to be actuated. When the controller determines that the magnitude of a requested vessel turn is greater than a first predetermined threshold, the controller decreases the desired differential between the first and second deployments, and accounts for the decreased desired differential deployment in its calculation of the first and second deployments.

According to another example of the present disclosure, a method for controlling an attitude of a marine vessel having first and second trim tabs comprises obtaining an actual vessel roll angle and providing the actual vessel roll angle to a controller. The method further comprises obtaining an actual vessel pitch angle; providing the actual vessel pitch angle to the controller; comparing the actual vessel pitch angle to a predetermined desired vessel pitch angle; and outputting a deployment setpoint that is calculated to achieve the desired vessel pitch angle. The method also includes comparing the actual vessel roll angle to a predetermined desired vessel roll angle; outputting a desired differential between first and second deployments of the first and second trim tabs, which desired differential is calculated to maintain the vessel at the desired vessel roll angle; and calculating the first and second deployments by accounting for both the deployment setpoint calculated to achieve the desired vessel pitch angle and the desired differential calculated to maintain the vessel at the desired vessel roll angle. The method includes decreasing the desired differential between the first and second deployments when the magnitude of a requested turn is greater than a first predetermined threshold, and subsequently recalculating the first and second deployments.

According to another example of the present disclosure, a method for controlling a deployment of a first trim tab and a deployment of a second trim tab on a marine vessel comprises determining if a steering command is greater than a first predetermined threshold; determining a direction of a turn requested by the steering command; and determining if one of the first and second trim tabs in the direction of the turn is more deployed than the other of the first and second trim tabs. If so, the method includes automatically retracting the one of the first and second trim tabs in the direction of the turn.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
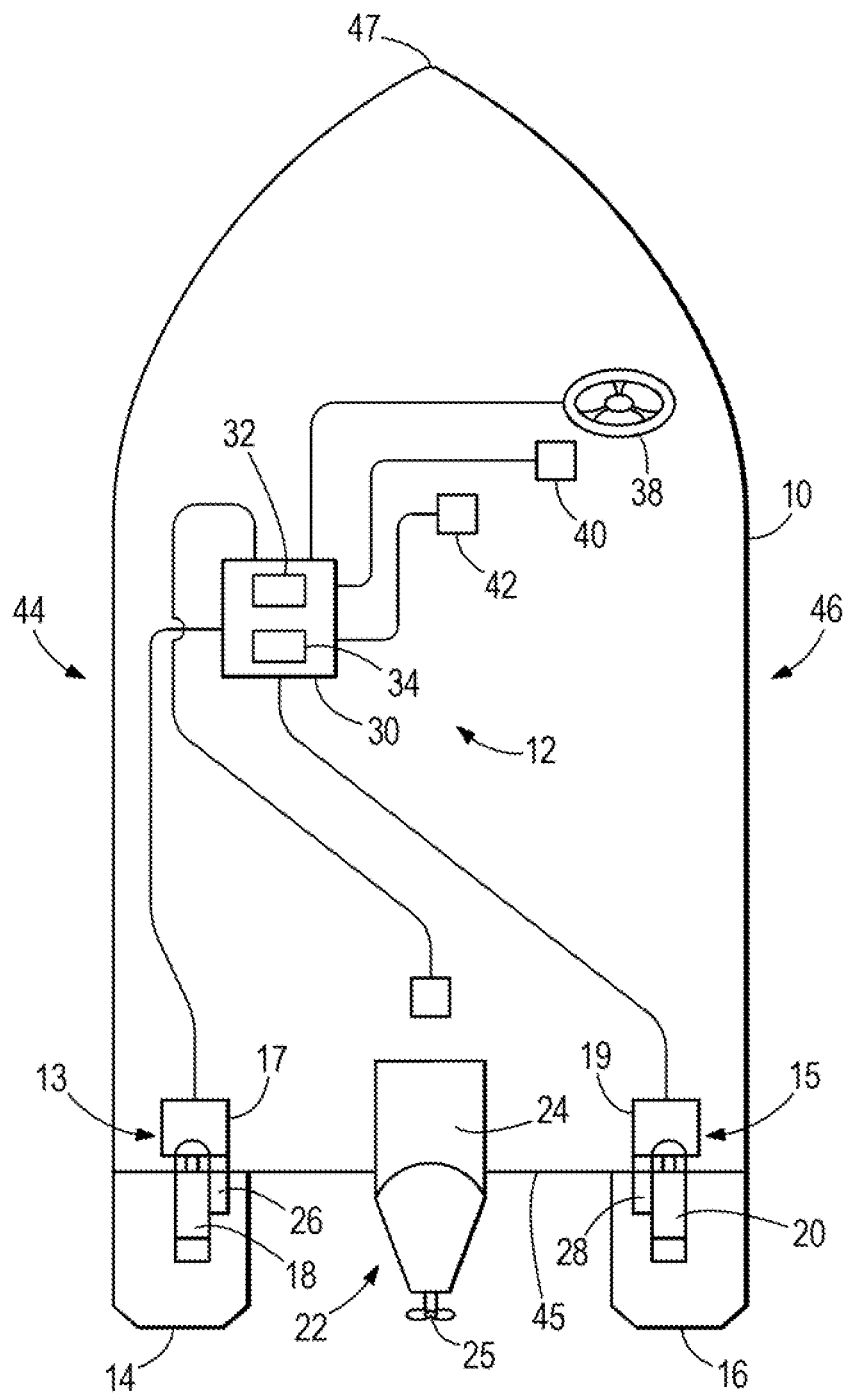
FIG. 1 illustrates a marine vessel according to the present disclosure.

FIG. 1 illustrates a marine vessel 10 having a system 12 for controlling an attitude of the marine vessel 10. The marine vessel 10 has first and second trim tabs 14, 16. Although in the example shown the trim tab 14 is a port trim tab and the trim tab 16 is a starboard trim tab, the orientation of the trim tabs 14, 16 and their designation as first and second need not correspond. In other words, the port trim tab need not be the first trim tab, and the starboard trim tab need not be the second trim tab, i.e., the designations as "first" and "second" could be reversed. The trim tab 14 is actuated by a trim tab actuator 13 and the trim tab 16 is actuated by a trim tab actuator 15. Marine vessel 10 includes a propulsion module 22, which may be, for example, a pod drive, inboard drive, or other type of stern drive. The propulsion module 22 has an engine 24 that turns a propeller 25 to produce a thrust to propel the marine vessel 10 in a generally forward direction. The propulsion module 22 is capable of rotating around a generally vertical axis in response to commands from a steering wheel 38 or autopilot section 40. Also included on the marine vessel 10 are trim tab sensors 26, 28, for sensing a position of the trim tabs 14, 16. For example, these sensors 26, 28 may be Hall Effect sensors.

The system 12 for controlling an attitude of the marine vessel 10 further includes a controller 30 having both a roll control section 32 and a pitch control section 34. The controller 30 has a memory and a programmable processor. As is conventional, the processor can be communicatively connected to a computer readable medium that includes volatile or nonvolatile memory upon which computer readable code is stored. The processor can access the computer readable code and the computer readable medium upon executing the code carries out the functions as described herein. It should be understood that the roll control section 32 and pitch control section 34 could be provided as two separate control sections as shown herein for exemplary purposes, or could instead be provided as a single portion of the controller 30. In the example shown, the controller 30, and thus the roll control section 32 and the pitch control section 34, are connected to the trim tab actuators 13, 15; the propulsion module 22; and the trim tab sensors 26, 28 via wired connections. However, it should be understood that these devices could be connected in other ways, such as, for example, wirelessly or through a wired network such as a CAN bus. In the example shown, the steering wheel 38, the autopilot section 40, and a pitch/roll sensor 42 are also connected to the controller 30. In one example, the pitch/roll sensor 42 is an attitude and heading reference system (AHRS) that provides 3D orientation of the marine vessel 10 by integrating gyroscopic measurements, accelerometer data, and magnetometer data. A gyroscope, motion reference unit (MRU), tilt sensor, inertial measurement unit (IMU), or any combination of these devices could instead be used. In another example, two separate sensors are provided for sensing pitch and roll of the marine vessel 10.

Trim tabs 14 and 16 are connected to the transom 45 of the marine vessel 10. These trim tabs 14 and 16 are designed to pivot. To put the bow 47 of the marine vessel 10 down, both trim tabs 14 and 16 are moved down to the maximum lowered position, or "trimmed-in" position. For low power or trailing operation, the trim tabs 14 and 16 are lifted to the maximum raised position, or "trimmed-out" position or zero degree position.

As mentioned, the marine vessel 10 is provided with first and second trim tab actuators 13, 15. The first actuator 13 may comprise a hydraulic cylinder 18 connected to an electro-hydraulic motor or pump 17. The hydraulic cylinder 18 operates to rotate the first trim tab 14 to the trimmed-out or zero degree position and the trimmed-in position and to maintain the trim tab 14 in any desired position. Similarly, the second actuator 15 may comprise a hydraulic cylinder 20 connected to an electro-hydraulic motor or pump 19. The hydraulic cylinder 20 operates to rotate the second trim tab 16 to the trimmed-out or zero degree position and the trimmed-in position and to maintain the trim tab 16 in any desired position. Other types of actuators 13, 15 could be used in other examples.

Figure 2:
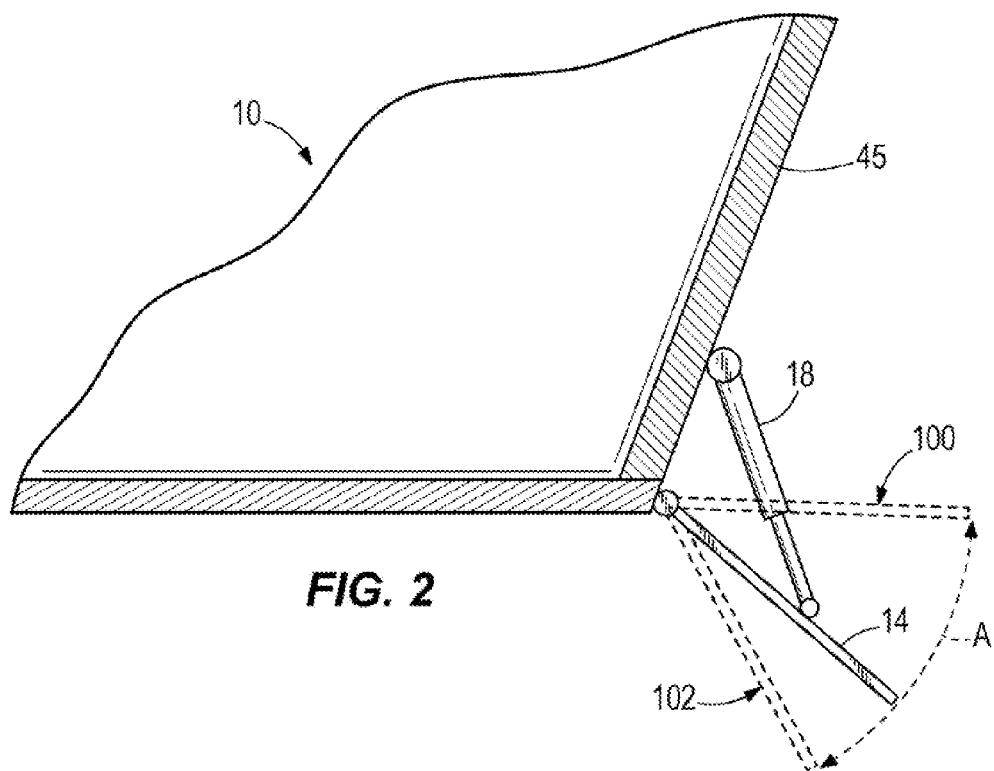
FIG. 2 illustrates a side view of a trim tab and various positions to which the trim tab may be actuated.

Those having ordinary skill in the art will appreciate that the trim tabs 14 and 16 can be actuated to different deployments with respect to the transom 45 of the marine vessel 10. With reference to FIG. 2, for example, the trim tabs 14, 16 can be deployed from 0% deployment where they project generally horizontally (position 100), to 100% deployment, where they lie at a calibrated maximum angle A with respect to horizontal (position 102). The calibrated maximum angle A at which the trim tabs 14, 16 are considered 100% deployed can vary based on the specifics of the marine vessel 10 to which the trim tabs 14, 16 are attached. In accordance with the nomenclature provided herein, the trim tabs 14, 16 are less deployed when they lie closer to horizontal (position 100), and are more deployed when they extend at increasingly greater angles to horizontal.

At times, it is desirable to deploy one of the trim tabs 14, 16 more or less than the other of the trim tabs 14, 16 in order to affect an attitude of the marine vessel 10. In doing so, the trim tabs 14, 16 will have a "differential" in their deployments, in that one of the trim tabs will be deployed at a value from 0 to 100% that is different than the value of deployment (from 0 to 100%) of the other of the trim tabs. For example, referring to FIG. 3, trim tab 14 might be at position 104, while trim tab 16 might be at position 106, creating a differential deployment of D. This differential deployment D can, for example, be quantified in terms of a percent deployment difference or as an angular difference, it being understood that the units by which deployment is measured are not limiting on the scope of the present disclosure. Differential deployment of the trim tabs 14, 16 may be desirable if, for example, a strong wind is blowing from the port side 44 of the marine vessel 10, causing the marine vessel to list to starboard 46. In response, the control system 12 may automatically deploy the trim tab 16 on the starboard side 46 of the marine vessel 10 such that is more deployed than the trim tab 14 on the port side 44. Deploying the trim tab 16 more than the trim tab 14 creates a greater upwardly directed force under the starboard side 46 of the marine vessel 10, due to an increased angle of attack of water on the trim tab 16. The greater force caused by the differential deployment lifts the starboard side 46 of the marine vessel 10 and rolls the vessel to port 44, thereby countering the list to starboard 46.

At other times, it may be desirable to purposely pitch the marine vessel 10 in a way that the marine vessel 10 would not otherwise be pitched were it not for deployment of the trim tabs 14, 16. For instance, if the marine vessel 10 is pitching fore or aft due to the effect of wind or waves, it may be desirable to deploy the trim tabs 14, 16 in a manner to counter this externally induced pitch. For example, if the marine vessel 10 is pitching in a backward direction, it may be desirable to increase the deployment of both trim tabs 14, 16 in order to increase the upward force on the stern (provided by the increased angle of the trim tabs) and thereby lower the bow 47 of the marine vessel 10. One example of when this type of control is needed is when the marine vessel 10 switches from operating at maximum speed, with tabs fully up, to barely planing speed. After the operator reduces the throttle, the pitch controller will increment the tabs to a more deployed state so as to keep the bow of the vessel down. Generally, in order to counter only externally induced pitch of a marine vessel 10, it is not necessary to differentially deploy the trim tabs 14, 16; rather, both trim tabs 14, 16 may be deployed to the same setpoint deployment, measured from horizontal.

Figure 4:
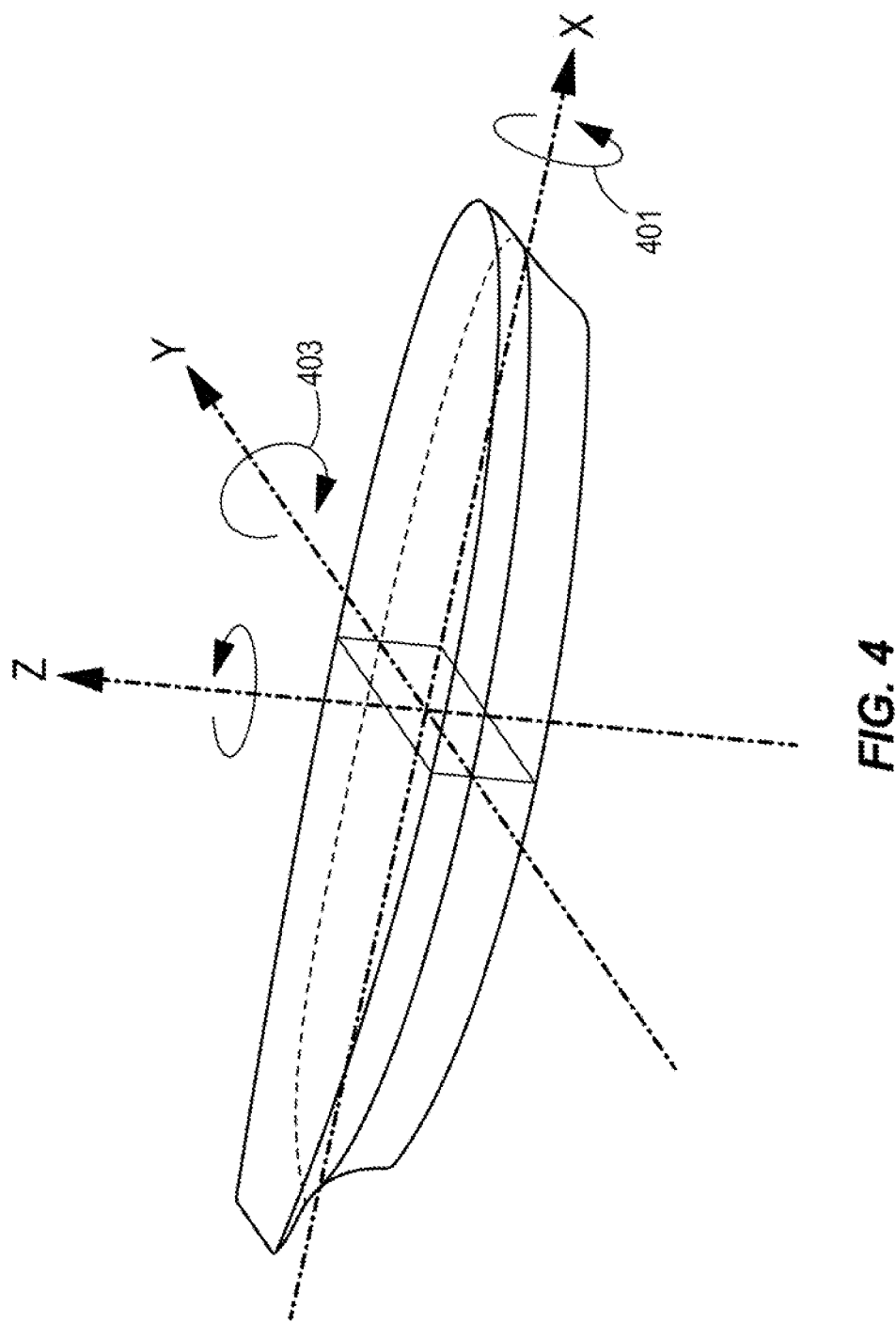
FIG. 4 illustrates a marine vessel and a coordinate system for defining movement and attitude of the marine vessel.

With reference to FIG. 4, a marine vessel's attitude can be described by its roll around an x-axis, its pitch around a y-axis, and its yaw around a z-axis. Roll error can be calculated by an angular difference from a horizontal plane defined by the x- and y-axes. As used herein, a positive roll error is around the x-axis in the direction of the arrow 401 shown in FIG. 4. A negative roll error is in the opposite direction. As used herein, a positive pitch error is around the y-axis in the direction of the arrow 403 shown in FIG. 4. A negative pitch error is in the opposite direction.

Referring back to FIG. 1, the present disclosure thereby provides for a system 12 for controlling an attitude of a marine vessel 10 having first and second trim tabs 14, 16. The system 12 comprises a controller 30 having a vessel roll control section 32 and a vessel pitch control section 34. The system 12 comprises first and second trim tab actuators 13, 15 in signal communication with the controller 30 that actuate the first and second trim tabs 14, 16 to first and second deployments. In one example, the first and second deployments are percentage values of a maximum angle of deployment from horizontal. In another example, the first and second deployments are values representing the angles from horizontal themselves. The system 12 further comprises a roll sensor that provides an actual vessel roll angle to the roll control section 32 and a pitch sensor that provides an actual vessel pitch angle to the pitch control section 34. In the example shown, the roll sensor and the pitch sensor are combined into one roll/pitch sensor 42.

The pitch control section 34 compares the actual vessel pitch angle to a predetermined desired vessel pitch angle, and outputs a deployment setpoint for the trim tabs 14, 16 that is calculated to achieve the desired pitch angle. In one example, the desired vessel pitch angle is close to zero, such that the marine vessel 10 is generally level with respect to the surface of a body of water in which it is operating (i.e., is not rotated around the y-axis of FIG. 4). As indicated above, the deployment setpoint is a calculated deployment from horizontal to which both the first and second trim tabs 14, 16 should to be actuated in order to achieve the desired pitch angle and/or counter an externally-induced pitch of the marine vessel 10. The system 12 uses feedback from the trim tab sensors 26, 28 and the pitch/roll sensor 42 in order to determine whether the marine vessel 10 has achieved the desired pitch angle and whether the trim tabs 14, 16 are to be actuated more or less in order to achieve such desired pitch angle.

Meanwhile, the roll control section 32 of the controller 30 compares the actual vessel roll angle to a predetermined desired vessel roll angle, and outputs a desired differential D between the first and second deployments of the first and second trim tabs 14, 16 that is calculated to maintain the marine vessel 10 at the desired vessel roll angle. In one example, the desired vessel roll angle is close to zero, such that the marine vessel is generally level with respect to the surface of the body of water in which it is operating (i.e., is not rotated around the x-axis of FIG. 4). As indicated above, this differential deployment is usually such that the trim tab 14 or 16 on the side to which the marine vessel 10 is listing is deployed to a greater extent than the trim tab 14 or 16 on the opposite side of the marine vessel 10. The system 12 uses feedback from the pitch/roll sensor 42 and the trim tab sensors 26, 28 in order to determine the optimal differential deployment D of the first and second trim tabs 14, 16 that will achieve the desired vessel roll angle.

The controller 30 then accounts for both the deployment setpoint output from the pitch control section 34 and the desired differential D output from the roll control section 32 in its calculation of the first and second deployments to which the first and second trim tabs 14, 16 are to be actuated. In other words, even if the pitch control section 34 indicates a deployment setpoint of X degrees from horizontal (or X % of maximum allowable deployment) in order to achieve the desired pitch angle, the controller 30 will then factor in the differential deployment D output from the roll control section 32 before sending a command to the trim tab actuators 13, 15. In one example, the controller 30 accounts for both the deployment setpoint and the desired differential D according to the equations:

$$FirstTab = PitchCntrl - (RollCntrl/2) \quad (1.1)$$

$$SecondTab = PitchCntrl + (RollCntrl/2) \quad (1.2)$$

where FirstTab is the deployment of the first trim tab, SecondTab is the deployment of the second trim tab, PitchCntrl is the deployment setpoint output from the pitch control section 34, and RollCntrl is the desired differential D output from the roll control section 32.

Through research and development, the present inventors have realized that when controlling a marine vessel's attitude according to the above-described system, the vessel handling is adversely affected. Specifically, when the marine vessel 10 makes a turn of a magnitude that exceeds a predetermined threshold, the marine vessel 10 has a tendency to act in a manner that the operator does not expect, especially when one of the first and second trim tabs 14, 16 is deployed more than the other. For example, the marine vessel 10 will tend to turn at a higher yaw rate, but remain relatively flat, when turning in the direction of the more deployed trim tab 14 or 16. On the other hand, the marine vessel 10 will have a very low yaw rate, yet will list heavily, when turning in the direction of the less deployed trim tab 14 or 16. The present inventors have realized that it would beneficial to retract the trim tab 14 or 16 that is on the inside of a turn in order to prevent this undesirable behavior. Therefore, according to the present disclosure, when the controller 30 determines that a magnitude of a requested vessel turn is greater than a first predetermined threshold, the controller 30 decreases the desired differential D between the first and second deployments, and accounts for the decreased desired differential deployment in its calculation of the first and second deployments. The equations for calculation of the deployments of the first and second trim tabs are then:

$$FirstTab = PitchCntrl - (AdjRollCntrl/2) \quad (2.1)$$

$$SecondTab = PitchCntrl + (AdjRollCntrl/2) \quad (2.2)$$

where FirstTab, SecondTab, and PitchCntrl are defined as above, and AdjRollCntrl is the desired differential output from the roll control section 32 after adjustment by the algorithm of the present disclosure. This algorithm decreases the desired differential when a magnitude of a requested turn is greater than the first predetermined threshold, and will be described further herein below.

Further, according the present disclosure, when the controller 30 determines that the magnitude of the requested turn is greater than a second predetermined threshold, the controller 30 sets the desired differential equal to 0. In this case, there is no differential D between the deployment of the first trim tab 14 and the deployment of the second trim tab 16 and both trim tabs 14, 16 are deployed to the same deployment from horizontal. When the magnitude of the requested turn is between the first and second predetermined thresholds, the controller 30 decreases the desired differential according to a blending coefficient K, as will be described below.

The requested turn may be input either via the steering wheel 38 or the autopilot section 40. In one example, the first predetermined threshold is a magnitude of a steering command value, which may vary based on the particular marine vessel and/or operator programming. In one example, the magnitude of the steering command value defining the first predetermined threshold is 2°. For example, when the operator of the marine vessel 10 turns the steering wheel 38 greater than 2° from center in either direction, the controller 30 will decrease the above-described desired differential D between the first and second deployments of the first and second trim tabs. In other examples, the first and second predetermined thresholds are not defined in terms of steering wheel percentage from center (or virtual steering wheel percentage from center, as with autopilot), but are defined as yaw rates of the marine vessel 10, a change in angle of the propulsion module 22, or a degree change in heading or course of the marine vessel 10, which examples are not limiting on the scope of the present disclosure. Further, it should be noted that the first and second predetermined thresholds are magnitudes, and therefore encompass both positive and negative values, i.e. requested turns in either direction. For example, if the predetermined threshold is 2°, then any requested turn greater than 2° or less than −2° will trigger the controller's algorithm.

Figure 3:
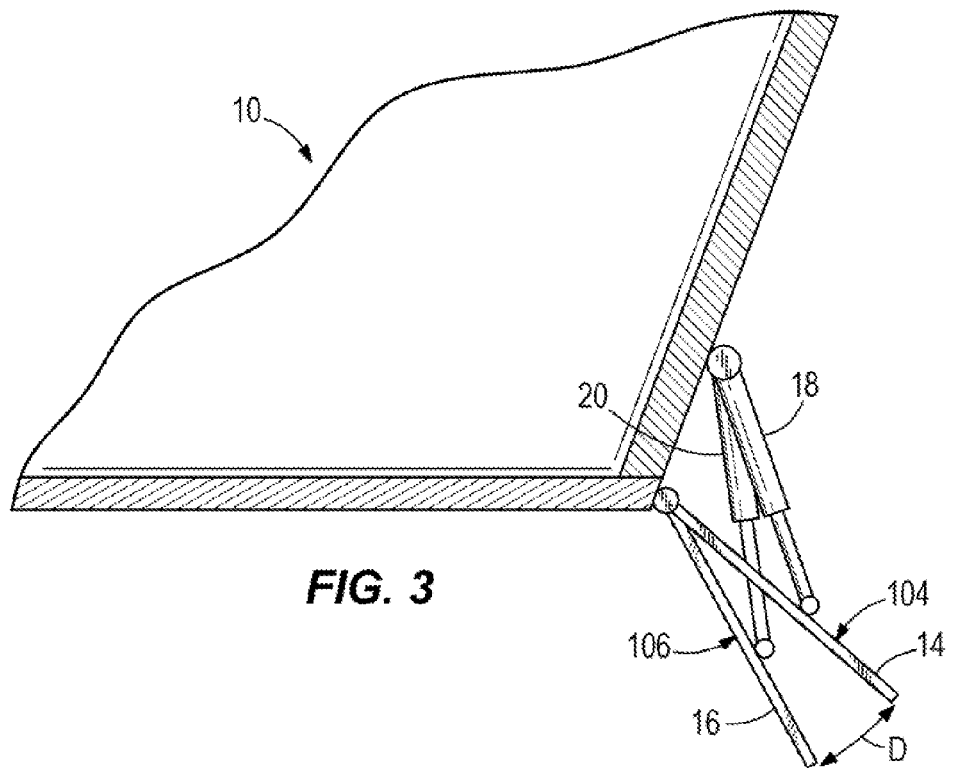
FIG. 3 illustrates a side view of first and second trim tabs having differential deployment.

In one example, when the magnitude of the requested turn is greater than a second predetermined threshold and therefore the desired differential is 0, the controller 30 commands each of the first and second trim tabs 14, 16 to a deployment that is an average of what the first and second deployments would have been had a turn of a magnitude greater than the first predetermined threshold not been requested. Referring to FIG. 3, if we assume, for example, that prior to a turn greater than the first predetermined magnitude being requested, trim tab 14 at position 104 is 40% deployed and trim tab 16 at position 106 is 60% deployed, then once a turn greater than the second predetermined threshold is requested, the controller 30 sends commands to actuate each trim tab 14, 16 to the average of these two previous deployments, i.e. to 50% deployment for both trim tab 14 and trim tab 16.

The difference between the values of the first and second predetermined thresholds can be calibrated based on the specific marine vessel and/or an operator's desire. For example, the first predetermined threshold can be set at 2° steering wheel angle and the second predetermined threshold can be set at 30° steering wheel angle. According to the present disclosure, and using the exemplary thresholds, when the magnitude of the requested turn is between the two thresholds (between 2° and 30°), the controller 30 can provide a blending coefficient by which to factor the output from the roll control section 32 of the controller 30. When the magnitude of the requested turn is between the first predetermined threshold and the second predetermined threshold, the controller 30 varies the desired differential linearly according to this blending coefficient. In one example, when the magnitude of the requested turn is between the first and second predetermined thresholds, the blending coefficient K is defined by the following equation:

$$K=1-((\text{ReqTurn}-\text{FirstThresh})/(\text{SecondThresh}-\text{FirstThresh})) \quad (3.1)$$

where K is the blending coefficient, ReqTurn is the magnitude of the requested turn, FirstThresh is the magnitude of the first predetermined threshold, and SecondThresh is the magnitude of the second predetermined threshold. In one example, the AdjRollCntrl value is therefore defined by the equation:

$$\text{AdjRollCntrl}=K*\text{RollCntrl} \quad (4.1)$$

Putting this equation 4.1 into equations 2.1 and 2.2 above, we have:

$$\text{FirstTab}=\text{PitchCntrl}-(K*\text{RollCntrl}/2) \quad (5.1)$$

$$\text{SecondTab}=\text{PitchCntrl}+(K*\text{RollCntrl}/2) \quad (5.2)$$

According to certain aspects of the present disclosure, the operator of the marine vessel 10 may wish to cause a quick drop off between the current differential deployment and a differential deployment of 0 when the steering request exceeds the second predetermined threshold. In this instance, the first and second predetermined thresholds may be set very close to one another, for example at 2° and 2.1°, such that very little blending in between the first and second thresholds occurs. In other words, if the first and second predetermined thresholds are set very close to one another, a very small bandwidth of steering wheel (or autopilot) request will experience any blending at all and the desired differential deployment will switch from being the value D output from the roll control section 32 to a value of 0 very quickly.

In one example, the blending coefficient K ranges from being 0 when the magnitude of the requested turn is greater than or equal to the second predetermined threshold, to being 1 when the magnitude of the requested turn is less than or equal to the first predetermined threshold. The blending coefficient also includes values between 0 and 1, for requested turns between the first and second predetermined thresholds, as described by equation 3.1 above. Utilization of the blending coefficient K moves the trim tabs 14, 16 so as to gradually close the differential deployment between the two as the magnitude of the requested turn gradually increases. This gradual decrease in differential deployment continues as the magnitude of the requested turn increases, until the magnitude of the requested turn exceeds the second predetermined threshold and the differential is set to 0.

Setting the blending coefficient K equal to 1 when the magnitude of the requested turn is less than or equal to the first predetermined threshold ensures that the controller 30 uses the output from the roll control section 32 as the desired differential deployment when the magnitude of the requested turn is not great enough to have an effect on the turning performance of the marine vessel 10 despite differential deployment of the trim tabs 14, 16. In other words, in the instance in which K=1, an un-factored output of the roll control section 32 is combined directly with the output of the pitch control section 34 for calculation of the desired deployment to be sent to the first and second trim tab actuators 13, 15. See equations 5.1 and 5.2. Setting the blending coefficient equal to 0 when the magnitude of the requested turn is greater than or equal to the second predetermined threshold ensures that the desired differential deployment D between the deployment of the first and second trim tabs 14, 16 (according the calculation of AdjRollCntrl in equation 4.1) is set equal to 0 when the magnitude of the requested turn is greater than or equal to the second predetermined threshold. This prevents the undesirable behavior of the marine vessel 10 encountered during significant turning maneuvers, as described herein above.

In the example equations 2.1, 2.2, 5.1, and 5.2 above, the controller 30 subtracts half of the desired differential from the deployment setpoint to determine the first deployment to which the first trim tab is to be actuated, and adds half desired differential to the deployment setpoint to determine the second deployment to which the second trim tab is to be actuated. Doing this ensures that the entire desired differential between the first and second trim tabs 14, 16 is accounted for. Which of the first and second trim tab deployments has half of the desired differential added to it, and which of the first and second trim tab deployments has half of the desired differential subtracted from it depends on the direction of roll error of the marine vessel 10. For example, when the marine vessel 10 encounters positive roll error (in the direction of arrow 401 in FIG. 4), the starboard tab needs to be deployed more in order to provide an upward force that counteracts the roll. In this instance, half of the desired differential will be added to the deployment setpoint to calculate the desired deployment of the starboard tab and half of the desired differential will be subtracted from the deployment setpoint to calculate the desired deployment of the port tab. On the other hand, if there is a negative roll error, the port tab needs to be deployed more in order to provide an upward force to counteract the roll. Half of the desired differential is added to the deployment setpoint to determine the port deployment, and half of the desired differential is subtracted from the deployment setpoint to determine the starboard deployment. This ensures that some level of roll control is still provided for the marine vessel 10, despite the fact that the desired differential is decreased in response to the magnitude of the turn.

Feed forward terms can be used to calculate the desired deployments of each of the first and second trim tabs 14, 16, according to other aspects of the present disclosure.

A roll feed forward term might be included when the marine vessel 10 is operating in quartering seas, with waves hitting the hull of the marine vessel 10 at an angle that decreases the hull's ability to dissipate energy. In this case, the waves may hit the vessel's hull perpendicular to the dead rise, causing a slamming feel. To help minimize this, the operator of the marine vessel 10 may wish to intentionally tip (roll) the boat away from the oncoming waves, in an attempt to change the angle at which the waves are hitting the hull. For example, with reference to FIG. 1, if the waves are approaching from port 44, the operator may obtain a smoother ride by intentionally rolling the boat to starboard 46. Adding a roll feed forward term into the calculation of the differential deployment helps keep the controller 30 from winding up to achieve a setpoint differential deployment at which the operator experiences a smoother ride.

For example, a roll feed forward term Roll_FF can be added to the calculation of the AdjRollCntrl of equation 4.1 as such:

$$\text{AdjRollCntrl} = K*(\text{Roll\_FF} + \text{RollCntrl}) \quad (6.1)$$

A speed-based feed forward term may also be used to calculate the desired deployment of the first and second trim tabs. The idea behind the speed-based feed forward term is to make the pitch control section 34 faster acting. The speed-based feed forward term is applied equally to the deployment of both the first and second trim tabs 14, 16. The speed-based feed forward term typically forces deployment of the trim tabs 14, 16 toward a more deployed state while the marine vessel 10 is getting on plane, and then gradually retracts the trim tabs 14, 16 with increasing marine vessel speed. The goal of such a calibration is to have a 0 output of the pitch control section 34 for a nominally loaded boat. Consider a marine vessel 10 operating at maximum speed with trim tabs 14, 16 fully retracted to keep the bow 47 of the marine vessel 10 up. When the operator pulls back the throttle of the marine vessel 10 to barely planing speed, one of two things could happen. Without a speed-based feed forward term, the pitch control section 34 increments the deployment of the tabs increasingly away from horizontal to keep the bow 47 of the marine vessel 10 down based on real-time feedback from the pitch/roll sensor 42. While the pitch control section 34 is working, the bow 47 will be high and visibility from the marine vessel 10 will be inhibited. On the other hand, with the speed-based feed forward term included, when the operator pulls back the throttles to barely planing speed, the speed-based feed forward term will preemptively increase tab deployment as speed decreases and before the bow 47 even begins to rise. The pitch control section 34 will not need to wind up to keep the bow 47 down; rather, the pitch control section 34 output should stay nominally around 0 if the speed-based feed forward term is calibrated or adapted correctly.

For example, the inclusion of a speed-based feed forward term Speed_FF can be included in the calculation of the differential deployments (see equations 5.1 and 5.2) according to the modified equations:

$$\text{FirstTab} = \text{PitchCntrl} + \text{Speed\_FF} - (\text{AdjRollCntrl}/2) \quad (7.1)$$

$$\text{SecondTab} = \text{PitchCntrl} + \text{Speed\_FF} + (\text{AdjRollCntrl}/2) \quad (7.2)$$

Ultimately, taking into account all of the Roll_FF term, the Speed_FF term, and the blending coefficient K, it can be seen that the controller 30 calculates the first and second deployments according to the equations:

$$FirstTab = PitchCntrl + \text{Speed\_FF} - \left(\frac{K*(\text{Roll}_{FF} + \text{RollCntrl})}{2}\right) \quad (8.1)$$

$$SecondTab = PitchCntrl + \text{Speed\_FF} + \left(\frac{K*(\text{Roll}_{FF} + \text{RollCntrl})}{2}\right) \quad (8.2)$$

When the magnitude of the requested turn is less than or equal to the first predetermined threshold. K=1 and:

$$FirstTab = PitchCntrl + \text{Speed\_FF} - \left(\frac{(\text{Roll}_{FF} + \text{RollCntrl})}{2}\right) \quad (9.1)$$

$$SecondTab = PitchCntrl + \text{Speed\_FF} + \left(\frac{(\text{Roll}_{FF} + \text{RollCntrl})}{2}\right) \quad (9.2)$$

When the magnitude of the requested turn is between the first and second predetermined thresholds, K is calculated according to equation 3.1 and:

$$FirstTab = PitchCntrl + \text{Speed\_FF} - \left(\frac{\left(1 - \left(\frac{ReqTurn - FirstThresh}{SecondThresh - FirstThresh}\right)\right) * (\text{Roll}_{FF} + \text{RollCntrl})}{2}\right) \quad (10.1)$$

-continued $$SecondTab = PitchCntrl + Speed\_FF + \left(\frac{\left(1 - \left(\frac{ReqTurn - FirstThresh}{SecondThresh - FirstThresh}\right)\right)*}{(Roll_{FF} + RollCntrl)}\right) \quad (10.2)$$

When the magnitude of the requested turn is greater than or equal to the second predetermined threshold, K=0 and:

FirstTab=PitchCntrl+Speed_FF (11.1)

SecondTab=PitchCntrl+Speed_FF (11.2)

Figure 5:
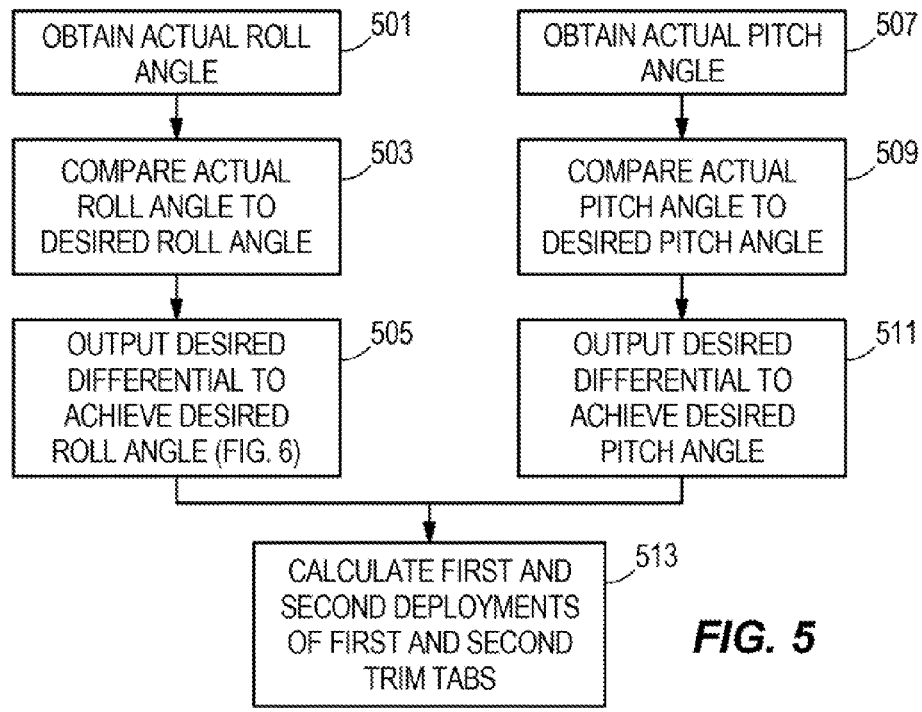
FIG. 5 illustrates a method for controlling an attitude of the marine vessel according to the present disclosure.

With reference to FIG. 5, also included in the present disclosure is a method for controlling an attitude of a marine vessel having first and second trim tabs 14, 16. As shown at 501, the method comprises obtaining an actual vessel roll angle and providing the actual vessel roll angle to a controller 30. The method also comprises obtaining an actual vessel pitch angle and providing the actual vessel pitch angle to the controller 30, as shown at 507. In one example, the actual vessel roll angle and actual vessel pitch angle can be determined using a pitch/roll sensor 42. The method includes comparing the actual vessel pitch angle to a predetermined desired vessel pitch angle, as shown at 509, and outputting a deployment setpoint that is calculated to achieve the desired vessel pitch angle, as shown at 511. The method also includes comparing the actual vessel roll angle to a predetermined desired vessel roll angle, as shown at 503, and outputting a desired differential D between first and second deployments of the first and second trim tabs 14, 16, which desired differential D is calculated to maintain the vessel at the desired vessel roll angle, as shown at 505. As shown at 513, the method further includes calculating the first and second deployments by accounting for both the deployment setpoint calculated to achieve the desired pitch angle (see 511) and the desired differential D calculated to maintain the vessel at the desired vessel roll angle (see 505).

Figure 6:
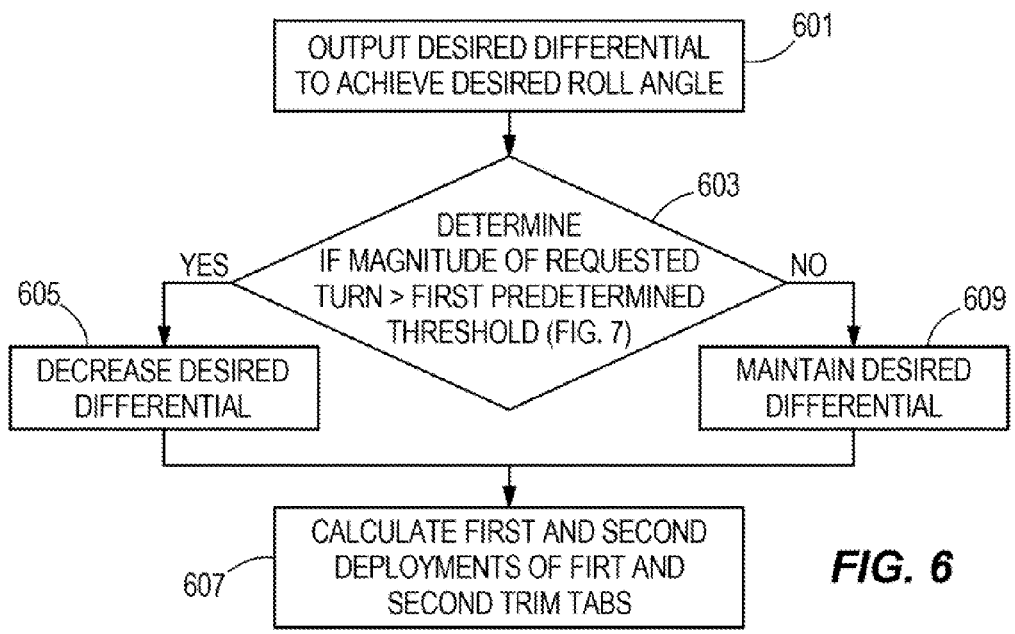
FIG. 6 illustrates further details of the method of FIG. 5.

With reference to FIG. 6, the method may further include recalculating the first and second deployments if a magnitude of a requested turn is greater than a first predetermined threshold. At 601, the method includes outputting a desired differential deployment that will achieve the desired roll angle. This can be done according to the steps in boxes 501, 503, and 505 of FIG. 5, for example. Next, the method includes determining if the magnitude of a requested turn is greater than a first predetermined threshold, as shown at 603. If the answer is yes, as shown at 605, the method includes decreasing the desired differential between the first and second deployments. The method then continues to 607, where the first and second deployments of the first and second trim tabs are calculated using the decreased desired differential. If the answer at 603 is no (i.e., the magnitude of the requested turn is not greater than the first predetermined threshold), then at 609 the method includes maintaining the desired differential that has been calculated to achieve the desired roll angle (see box 505, FIG. 5). The method then continues to 607, where the first and second deployments of the first and second trim tabs are calculated using the un-altered desired differential.

Figure 7:
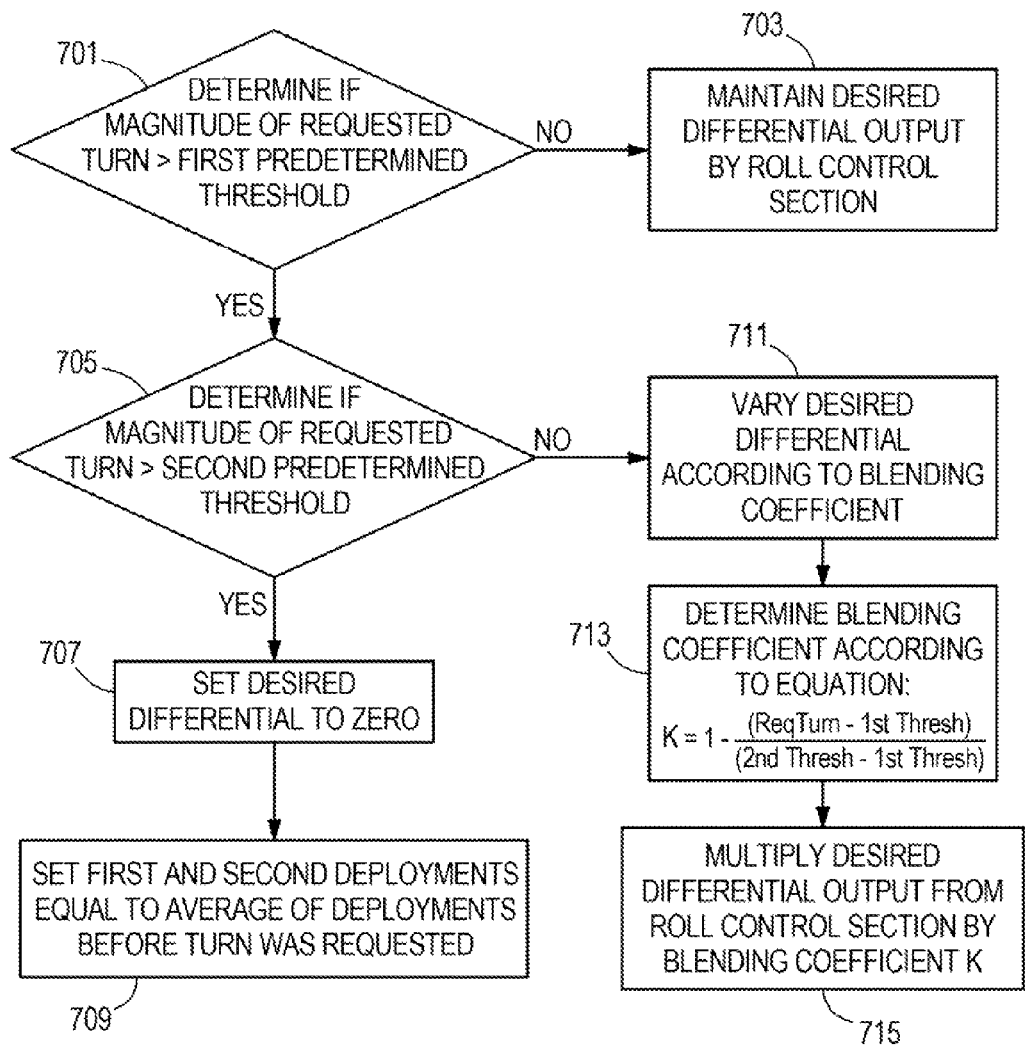
FIG. 7 illustrates further details of the method of FIG. 6.

Turning to FIG. 7, further details regarding a method for determining the desired differential are disclosed. The method includes determining if the magnitude of a requested turn is greater than a first predetermined threshold. If the answer is no, the method continues to 703, and the desired differential output by the roll control section 32 is maintained (see also box 609, FIG. 6). The desired differential that has been calculated to maintain the vessel 10 at the desired vessel roll angle is then used in the calculation of the deployments of each of the first and second trim tabs 14, 16. If the answer at 701 is yes, then the method continues to 705 and a determination is made as to whether the magnitude of the requested turn is greater than a second predetermined threshold. If the answer is yes, the method continues to 707 and the desired differential is set to 0. Subsequently, the method continues to 709 and the first and second deployments are set equal to the average of the deployments before the turn was requested.

If the answer at 705 is no (i.e., the magnitude of the requested turn is greater than the first predetermined threshold, but less than the second predetermined threshold), then the method continues to 711, and includes varying the desired differential according to a blending coefficient. At 713, the blending coefficient K is determined according to equation 3.1 above and shown in box 713. The method then continues to 715, and includes multiplying the desired differential output from the roll control section 32 (i.e. that which was calculated to maintain the vessel at the desired roll angle) by the blending coefficient K calculated at 713 (see also box 605, FIG. 6). This adjusted (decreased) desired differential is then used in the calculation of the desired deployments of the first and second trim tabs (see box 607, FIG. 6) which calculation incorporates the output from the pitch control section 34 as well. See equations 8.1 and 8.2.

Figure 8:
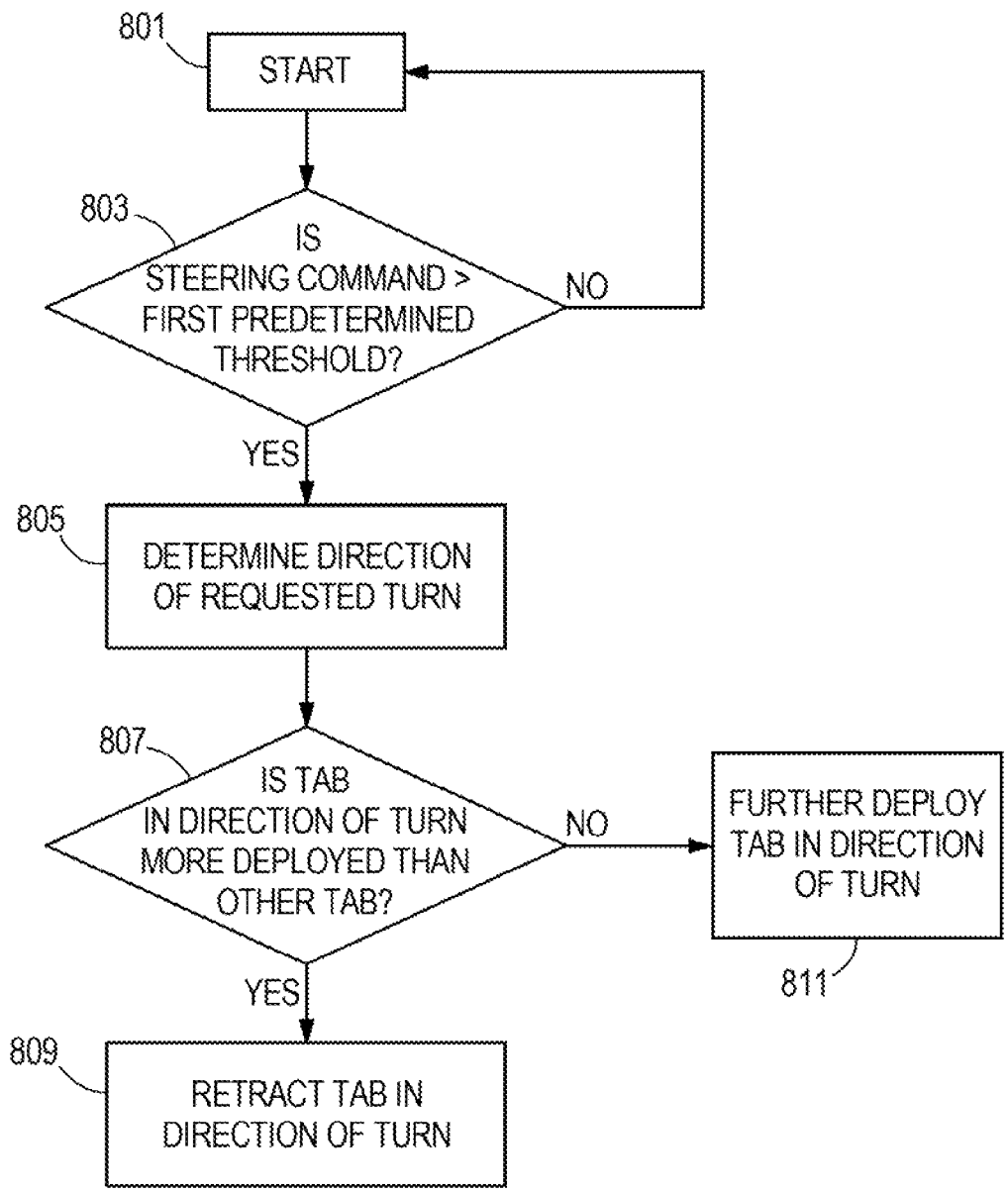
FIG. 8 illustrates a method for controlling a deployment of a first trim tab and a deployment of a second trim tab on a marine vessel.

Now turning to FIG. 8, a method for controlling a deployment of a first trim tab and a deployment of a second trim tab on a marine vessel 10 will be described. The method begins at 801. The method includes determining whether a steering command is greater than a first predetermined threshold, as shown at 803. The steering command may be from the steering wheel 38 or the autopilot section 40. If no at 803, the method returns to start. If yes at 803, as shown at 805, the method includes determining a direction of a turn requested by the steering command. At 807, the method includes determining if one of the first and second trim tabs 14, 16 in the direction of the turn is more deployed than the other of the first and second trim tabs 14, 16. If yes, the method continues at 809 and includes retracting the more deployed one of the first and second trim tabs 14, 16 that is in the direction of the turn. If no, as shown at 811, the trim tab in the direction of the turn is further deployed. The method may further comprise blending a maximum allowable differential between the deployments of the first and second trim tabs to 0 over a calibratable range of steering command values. The method may further comprise determining if the steering command has subsequently fallen below the first predetermined threshold, and if so, blending the deployment of the first trim tab back to its value before the turn was requested and blending the deployment of the second trim tab back to its value before the turn was requested.

It should be understood that all of the examples provided herein need not be restricted to the exemplary values also provided herein. Rather, the difference between the first and second predetermined thresholds and the magnitudes of the predetermined thresholds can be calibrated based on the desire of the manufacturer and/or operator of the marine vessel. Additionally, blending of the desired differential deployment when a requested turn is between the first and second thresholds need not be according to a coefficient K that causes linear blending, but could be according to different types of mathematical relationships. Further, when the desired differential decreases to 0, each of the first and second trim tabs 14, 16 need not be deployed to an average of what they were prior to the turn of the first predetermined threshold being requested; in other examples, they could be deployed such that one of the previous deployments of the first and second trim tabs is weighted more heavily than the other of the previous deployments.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. §112(f), only if the terms "means for" or "step for" are explicitly recited in the respective limitation.

What is claimed is:

1. A system for controlling an attitude of a marine vessel having first and second trim tabs, the system comprising:
    a controller having a vessel roll control section and a vessel pitch control section;
    first and second trim tab actuators in signal communication with the controller that actuate the first and second trim tabs to first and second deployments, respectively;
    a roll sensor that provides an actual vessel roll angle to the roll control section; and
    a pitch sensor that provides an actual vessel pitch angle to the pitch control section;
    wherein the pitch control section compares the actual vessel pitch angle to a predetermined desired vessel pitch angle and outputs a deployment setpoint that is calculated to achieve the desired vessel pitch angle;
    wherein the roll control section compares the actual vessel roll angle to a predetermined desired vessel roll angle, and outputs a desired differential between the first and second deployments that is calculated to maintain the vessel at the desired vessel roll angle;
    wherein the controller accounts for both the deployment setpoint output from the pitch control section and the desired differential output from the roll control section in its calculation of the first and second deployments to which the first and second trim tabs are to be actuated; and
    wherein, when the controller determines that a magnitude of a requested vessel turn is greater than a first predetermined threshold, the controller decreases the desired differential between the first and second deployments, and accounts for the decreased desired differential deployment in its calculation of the first and second deployments.

2. The system of claim 1, wherein when the controller determines that the magnitude of the requested turn is greater than a second predetermined threshold, the controller sets the desired differential equal to 0.

3. The system of claim 2, wherein when the desired differential is 0, the controller commands each of the first and second trim tabs to a deployment that is an average of what the first and second deployments would have been had the turn of the magnitude greater than the first predetermined threshold not been requested.

4. The system of claim 2, wherein, when the magnitude of the requested turn is between the first predetermined threshold and the second predetermined threshold, the controller varies the desired differential linearly according to a blending coefficient.

5. The system of claim 4, wherein the blending coefficient ranges from being 0 when the magnitude of the requested turn is greater than or equal to the second predetermined threshold, to being 1 when the magnitude of the requested turn is less than or equal to the first predetermined threshold, and includes values between 0 and 1.

6. The system of claim 5, wherein the controller adds half of the desired differential to the deployment setpoint to determine the first deployment to which the first trim tab is to be actuated, and subtracts half the desired differential from the deployment setpoint to determine the second deployment to which the second trim tab is to be actuated.

7. The system of claim 6, wherein the controller accounts for a speed-based feed forward term when calculating the first and second deployments.

8. The system of claim 7, wherein the controller calculates the first and second deployments according to the equations:

$$FirstTab = PitchCntrl + \text{Speed\_FF} - \left(\frac{K*(\text{Roll}_{FF} + RollCntrl)}{2}\right)$$

and $$SecondTab = PitchCntrl + \text{Speed\_FF} + \left(\frac{K*(\text{Roll}_{FF} + RollCntrl)}{2}\right)$$

wherein FirstTab is the first deployment, SecondTab is the second deployment, PitchCntrl is the deployment setpoint output from the pitch control section, Speed_FF is the speed-based feed forward term, K is the blending coefficient, Roll_FF is a roll-feed-forward term, and RollCntrl is the desired differential output from the roll control section.

9. A method for controlling an attitude of a marine vessel having first and second trim tabs, the method comprising:
    obtaining an actual vessel roll angle and providing the actual vessel roll angle to a controller;
    obtaining an actual vessel pitch angle and providing the actual vessel pitch angle to the controller;
    comparing the actual vessel pitch angle to a predetermined desired vessel pitch angle and outputting a deployment setpoint that is calculated to achieve the desired vessel pitch angle;
    comparing the actual vessel roll angle to a predetermined desired vessel roll angle, and outputting a desired differential between first and second deployments of the first and second trim tabs, which desired differential is calculated to maintain the vessel at the desired vessel roll angle;
    calculating the first and second deployments by accounting for both the deployment setpoint calculated to achieve the desired vessel pitch angle and the desired differential calculated to maintain the vessel at the desired vessel roll angle; and
    decreasing the desired differential between the first and second deployments when a magnitude of a requested turn is greater than a first predetermined threshold, and subsequently recalculating the first and second deployments.

10. The method of claim 9, further comprising setting the desired differential equal to 0 when the magnitude of the requested turn is greater than a second predetermined threshold.

11. The method of claim 10, further comprising commanding each of the first and second trim tabs to a deployment that is an average of what the first and second deployments would have been had the turn of the magnitude greater than the first predetermined threshold not been requested.

12. The method of claim 10, further comprising varying the desired differential linearly according to a blending coefficient when the magnitude of the requested turn is between the first predetermined threshold and the second predetermined threshold.

13. The method of claim 12, wherein the blending coefficient ranges from being 0 when the magnitude of the requested turn is greater than or equal to the second predetermined threshold, to being 1 when the magnitude of the requested turn is less than or equal to the first predetermined threshold, and includes values between 0 and 1.

14. The method of claim 13, further comprising adding half of the desired differential to the deployment setpoint to determine the first deployment to which the first trim tab is to be actuated, and subtracting half the desired differential from the deployment setpoint to determine the second deployment to which the second trim tab is to be actuated.

15. The method of claim 14, further comprising accounting for a speed-based feed forward term when calculating the first and second deployments.

16. The method of claim 15, further comprising calculating the first and second deployments according to the equations:

$$FirstTab = PitchCntrl + Speed\_FF - \left(\frac{K*(Roll_{FF} + RollCntrl)}{2}\right)$$

and $$SecondTab = PitchCntrl + Speed\_FF + \left(\frac{K*(Roll_{FF} + RollCntrl)}{2}\right)$$

wherein FirstTab is the first deployment, SecondTab is the second deployment, PitchCntrl is the deployment setpoint, Speed_FF is the speed-based feed forward term, K is the blending coefficient, Roll_FF is a roll-feed-forward term, and RollCntrl is the desired differential.

17. A method for controlling a deployment of a first trim tab and a deployment of a second trim tab on a marine vessel, the method comprising:
   determining if a steering command is greater than a first predetermined threshold;
   determining a direction of a turn requested by the steering command;
   determining if one of the first and second trim tabs in the direction of the turn is more deployed than the other of the first and second trim tabs; and automatically retracting the one of the first and second trim tabs in the direction of the turn if the steering command is greater than the first predetermined threshold and the one of the first and second trim tabs in the direction of the turn is more deployed than the other.

18. The method of claim 17, further comprising blending a maximum allowable differential between the deployments of the first and second trim tabs to 0 over a calibratable range of steering command values.

19. The method of claim 18, wherein when the maximum allowable differential between the deployments is 0, the deployment of each of the first and second trim tabs is an average of a deployment of the first trim tab before the turn was requested and a deployment of the second trim tab before the turn was requested.

20. The method of claim 19, further comprising determining if the steering command has subsequently fallen below the first predetermined threshold, and if so, blending the deployment of the first trim tab back to its value before the turn was requested and blending the deployment of the second trim tab back to its value before the turn was requested.

* * * * *